United States Patent
Tsai

(10) Patent No.: US 8,112,646 B2
(45) Date of Patent: Feb. 7, 2012

(54) BUFFERING TECHNIQUES FOR POWER MANAGEMENT

(75) Inventor: Jr-Shian Tsai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 12/208,654

(22) Filed: Sep. 11, 2008

(65) Prior Publication Data
US 2009/0077401 A1 Mar. 19, 2009

Related U.S. Application Data

(60) Provisional application No. 60/973,031, filed on Sep. 17, 2007, provisional application No. 60/973,035, filed on Sep. 17, 2007, provisional application No. 60/973,038, filed on Sep. 17, 2007, provisional application No. 60/973,044, filed on Sep. 17, 2007.

(51) Int. Cl.
*G06F 1/00* (2006.01)
*G06F 1/26* (2006.01)
*G06F 1/32* (2006.01)
*G06F 3/00* (2006.01)

(52) U.S. Cl. ........ 713/320; 713/300; 713/322; 713/323; 713/340; 710/52; 710/57

(58) Field of Classification Search .......... 713/300, 713/310, 320, 323, 324, 340; 710/29, 35, 710/52, 56, 57
See application file for complete search history.

(56) References Cited

U.S. PATENT DOCUMENTS

| | | | | |
|---|---|---|---|---|
| 5,210,829 A * | 5/1993 | Bitner | | 710/57 |
| 6,311,081 B1 | 10/2001 | Northcutt et al. | | |
| 6,865,653 B2 | 3/2005 | Zaccarin et al. | | |
| 2003/0067872 A1 * | 4/2003 | Harrell et al. | | 370/229 |
| 2003/0131273 A1 | 7/2003 | Watts, Jr. et al. | | |
| 2003/0137945 A1 * | 7/2003 | Yavatkar et al. | | 370/282 |
| 2004/0073692 A1 * | 4/2004 | Gentle et al. | | 709/231 |
| 2004/0264396 A1 | 12/2004 | Ginzburg et al. | | |
| 2005/0073952 A1 * | 4/2005 | Champlin et al. | | 370/229 |
| 2005/0180443 A1 * | 8/2005 | Schulz et al. | | 370/412 |
| 2006/0227815 A1 * | 10/2006 | Khan | | 370/535 |
| 2007/0242676 A1 * | 10/2007 | Fridman | | 370/395.5 |
| 2008/0005405 A1 * | 1/2008 | Innis et al. | | 710/56 |
| 2009/0077394 A1 * | 3/2009 | Tsai et al. | | 713/310 |
| 2009/0077395 A1 * | 3/2009 | Tsai | | 713/310 |
| 2009/0077396 A1 * | 3/2009 | Tsai et al. | | 713/310 |
| 2009/0077401 A1 * | 3/2009 | Tsai | | 713/320 |

FOREIGN PATENT DOCUMENTS

JP 04067248 A * 3/1992
WO 2009039034 A1 3/2009

OTHER PUBLICATIONS

"International Search Report/Written Opinion received for PCT Application No. PCT/US2008/076135 mailed on Feb. 27, 2009", 11 pages.

* cited by examiner

*Primary Examiner* — Thomas J Cleary
(74) *Attorney, Agent, or Firm* — Kacvinsky Daisak, PLLC

(57) ABSTRACT

Buffering techniques for power management are described. A method may comprise modifying a power state for a communications sub-system and a computing sub-system from a higher power state to a lower power state, storing packets of information in a buffer for the communications sub-system during a communications idle duration period, generating a variable receive threshold value for the buffer, and transferring the stored packets of information from the buffer to the computing sub-system based on a variable receive threshold value. Other embodiments are described and claimed.

14 Claims, 5 Drawing Sheets

300

- MODIFY A POWER STATE FOR A COMMUNICATIONS SUB-SYSTEM AND A COMPUTING SUB-SYSTEM FROM A HIGHER POWER STATE TO A LOWER POWER STATE
302

- STORE PACKETS OF INFORMATION IN A BUFFER FOR THE COMMUNICATIONS SUB-SYSTEM DURING A COMMUNICATIONS IDLE DURATION PERIOD TO CREATE A COMPUTING IDLE DURATION PERIOD
304

- GENERATE A VARIABLE RECEIVE THRESHOLD VALUE FOR THE BUFFER
306

- TRANSFER THE STORED PACKETS OF INFORMATION FROM THE BUFFER TO THE COMPUTING SUB-SYSTEM BASED ON A VARIABLE RECEIVE THRESHOLD VALUE
308

FIG. 3

BUFFERING TECHNIQUES FOR POWER MANAGEMENT

CROSS REFERENCE TO RELATED APPLICATIONS

This application claims priority to U.S. Patent Provisional Application Ser. No. 60/973,031 titled "BUFFERING TECHNIQUES FOR POWER MANAGEMENT" filed on Sep. 17, 2007, and is related to U.S. Patent Provisional Application Ser. No. 60/973,035 titled "TECHNIQUES FOR COMMUNICATIONS BASED POWER MANAGEMENT" filed on Sep. 17, 2007, U.S. Patent Provisional Application Ser. No. 60/973,038 titled "TECHNIQUES FOR COMMUNICATIONS POWER MANAGEMENT BASED ON SYSTEM STATES" filed on Sep. 17, 2007, and U.S. Patent Provisional Application Ser. No. 60/973,044 titled "TECHNIQUES FOR COLLABORATIVE POWER MANAGEMENT FOR HETEROGENEOUS NETWORKS" filed on Sep. 17, 2007, all three of which are hereby incorporated by reference in their entirety.

BACKGROUND

Power management for electronic devices such as computer systems play an important part in conserving energy, managing heat dissipation, and improving overall system performance. Modern computers systems are increasingly designed to be used in settings where a reliable external power supply is not available making power management to conserve energy important. Power management techniques allow certain components of a computer system to be powered down or put in a sleep mode that requires less power than while in active operation, thereby reducing the total amount of energy consumed by a device over some period of time. Energy conservation is especially important for mobile devices to conserve battery power. Even when reliable external power supplies are available careful power management within the computing system can reduce heat produced by the system enabling improved performance of the system. Computing systems generally have better performance at lower ambient temperatures because key components can run at higher speeds without damaging their circuitry. Consequently, there are many advantages to enhancing power management for electronic devices.

BRIEF DESCRIPTION OF THE DRAWINGS

FIG. 3 illustrates one embodiment of a first logic diagram.

DETAILED DESCRIPTION

Figure 1:
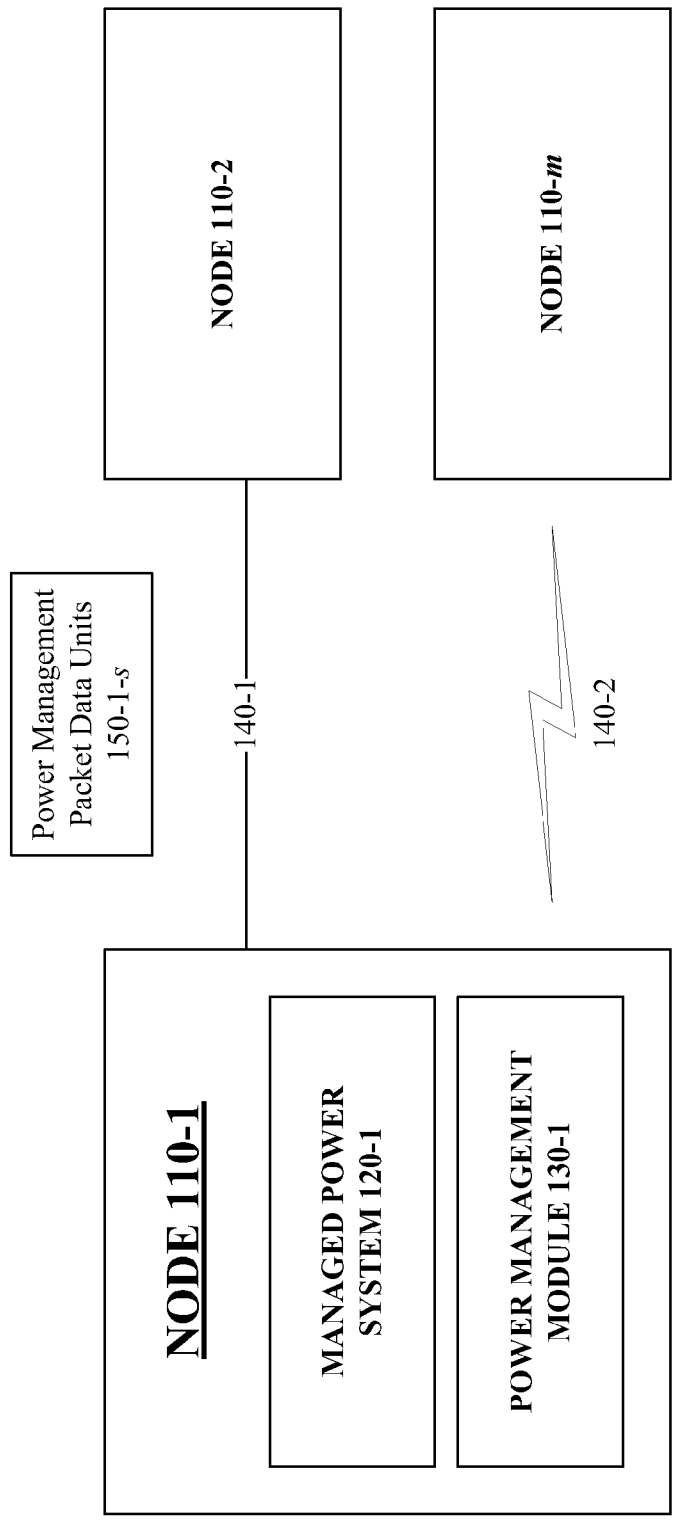
FIG. 1 illustrates one embodiment of a communications system.

Various embodiments may be generally directed to buffering techniques to provide enhanced power management. Some embodiments may be particularly directed to power management techniques for conserving energy in a node operating from an energy storage device such as a battery. In one embodiment, for example, an apparatus such as a network device may include a power management module having a power management controller, and a managed power system to couple to the power management module. The managed power system may comprise a communications sub-system and a computing sub-system. The power management controller may be arranged to switch the communications sub-system and the computing sub-system to a lower power state to conserve energy.

In various embodiments, a communications sub-system for a first node may be arranged to process and store information received from other nodes within a communications system in a manner that increases energy conservation for a computing sub-system of the first node. In some embodiments, the communications sub-system may extend a time period for when the computing sub-system may remain in a lower power state by buffering packets and event information until ready for processing by the computing sub-system. This may reduce the number of interrupts sent to the computing sub-system when in a lower power state, with each interrupt forcing the computing sub-system to resume a higher power state to service the interrupt. This technique may sometimes be referred to as "interrupt coalescing."

In one embodiment, for example, the communications sub-system may further include a transceiver, buffer, watermark generator, and a buffer manager. The transceiver may be arranged to communicate information over a network. The buffer may be coupled to the transceiver, and arranged to store packets of information for the transceiver during a communications idle duration period to create a computing idle duration period. The communications idle duration period, for example, may refer to a time interval when the communications sub-system does not receive (or expect to receive) information from a network. The computing idle duration period, for example, may refer to a time interval when the computing sub-system does not receive (or expect to receive) information from the communications sub-system. The watermark generator may be coupled to the buffer, and arranged to generate a variable receive threshold value. The buffer manager may be coupled to the buffer and the watermark generator, and arranged to transfer the stored packets of information from the buffer to the computing sub-system based on a variable receive threshold value, among other factors. The variable receive threshold value may be algorithmically derived based on changing communications power state information, as described in more detail below. In this manner, the power management module may perform enhanced energy conservation for the managed power system by implementing buffering techniques and/or logic that allows the communications sub-system and/or the computing sub-system to enter and remain within a lower power state, while maintaining Quality of Service (QoS) and other performance requirements for the communications sub-system and/or the computing sub-system. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes in a certain topology by way of example, it can be appreciated that more or less nodes may be employed in different topologies for a given implementation.

In various embodiments, the communications system 100 may comprise, or form part of, a wired communications system, a wireless communications system, or a combination of both. For example, the communications system 100 may include one or more nodes 110-1-$m$ arranged to communicate information over one or more types of wired communications links, such as a wired communications link 140-1. Examples of the wired communications link 140-1 may include without limitation a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes 110-1-$m$ arranged to communicate information over one or more types of wireless communications links, such as wireless shared media 140-2. Examples of the wireless shared media 140-2 may include without limitation a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communications, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple nodes 110-1-$m$. The nodes 110-1-$m$ may comprise or be implemented as any type of fixed or mobile electronic device or resource, including a network device, network endpoint equipment, network infrastructure equipment, cellular radiotelephone network equipment, a processing system, a computer system, a computer sub-system, a computer, a workstation, a terminal, a server, a personal computer (PC), a laptop computer, an ultra-laptop computer, a portable computer, a handheld computer, a personal digital assistant (PDA), a cellular telephone, a smart phone, a router, a switch, a bridge, a gateway, a network appliance, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. In some embodiments, some of the nodes 10-1-$m$ may represent heterogeneous network devices. In one embodiment, for example, the nodes 110-1-$m$ may comprise various mobile computer systems (e.g., laptop computers, handheld computers, smart phones, cellular telephones, and so forth) utilizing a mobile power source, such as one or more batteries.

Although some of the nodes 110-1-$m$ may comprise different network devices, each of the nodes 110-1-$m$ may include a common number of elements as shown by the node 110-1. For example, the nodes 110-1-$m$ may each include various power management elements to implement a power management scheme operative to perform power management operations for the nodes 110-1-$m$. In the illustrated embodiment shown in FIG. 1, for example, a first node 110-1 may include a managed power system 120-1 coupled to a power management module 130-1. The power management module 130-1 may be operative to communicate power state information with a second node (e.g., one of the nodes 110-2-$m$) over a communications connection established via the communications links 140-1, 140-2. In general operation, the power management module 130-1 may manage various power states for the managed power system 120-1 of the first node 110-1. The power state information may include past, present or future power states for one or more portions of a managed power system 120-1 of the first node 110-1. In this manner, the portions of a managed power system 120-1 may exchange power state information to improve or enhance power state management for the first node 110-1. For example, the power management module 130-1 may synchronize power management operations between the sub-systems 210-1, 230-1 of the managed power system 120-1, such as placing computing components of the computing sub-system 230-1 in lower power states based on operations or anticipated operations for the communications components of the communications sub-system 210-1 for a given power state duration period, and vice-versa.

Although the node 110-1 is the only node shown in FIG. 1 to include the managed power system 120-1 and the power management module 130-1, it may be appreciated that each of the nodes 10-1-$m$ may include an identical or similar managed power system 120-1-$n$ and power management module 130-1-$p$. For example, the node 110-2 may include a managed power system 120-2 coupled to a power management module 130-2, the node 110-3 may include the elements 120-3, 130-3, and so forth. Furthermore, the descriptions and examples of the structures and operations provided with reference to the managed power system 120-1 and the power management module 130-1 may also apply to the corresponding elements in the other nodes 110-2-$m$. Exemplary embodiments for the managed power system 120-1-$n$ and the power management module 130-1-$p$ may be described in more detail with reference to FIG. 2.

Figure 2:
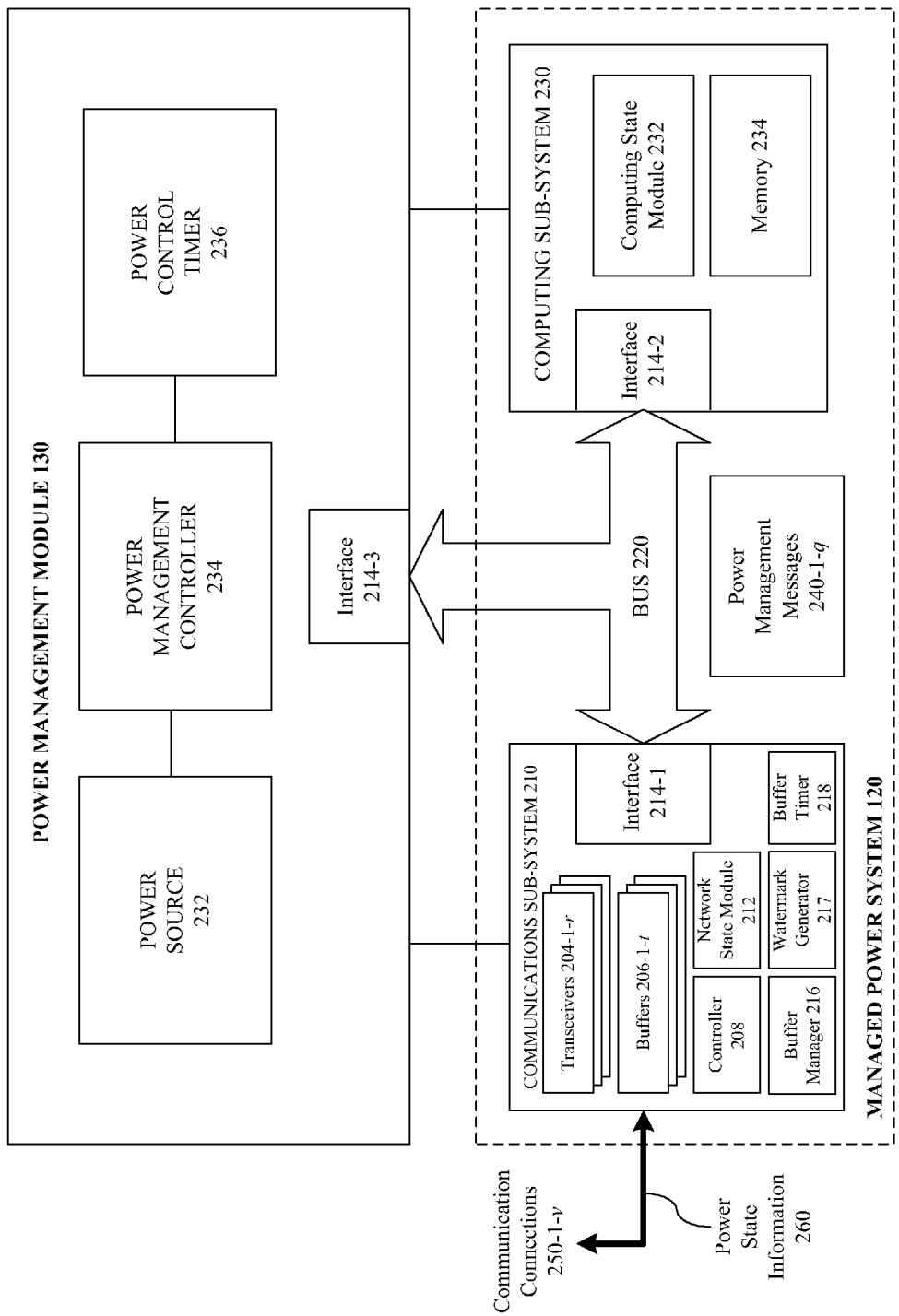
FIG. 2 illustrates one embodiment of an apparatus.

FIG. 2 illustrates a more detailed block diagram for a managed power system 120 and a power management module 130. In the illustrated embodiment shown in FIG. 2, the managed power system 120 may include a communications sub-system 210 and a computing sub-system 230. Although FIG. 2 may show a limited number of power management elements in a certain arrangement by way of example, it can be appreciated that more or less power management elements may be employed in different arrangements for a given implementation.

In various embodiments, the managed power system 120 may include any electrical or electronic elements of the nodes 110-1-$m$ consuming power from the power source 232 and suitable for power management operations. Power management techniques allow certain components of an electronic device or system (e.g., a computer system) to be powered down or put in a sleep mode that requires less power than while in active operation, thereby reducing the total amount of energy consumed by a device over some period of time. The power management techniques may be implemented by power gating and/or clock gating various hardware elements of the managed power system 120, thereby conserving battery power.

More particularly, the managed power system 120 may include various electrical or electronic elements of the nodes 110-1-$m$ that can operate in various power states drawing multiple levels of power from the power source 232 as controlled by the power management controller 234 of the power management module 130. The various power states may be defined by any number of power management schemes. In some cases, for example, the power states may be defined in accordance with the Advanced Configuration and Power Interface (ACPI) series of specifications, including their progeny, revisions and variants. In one embodiment, for example, the power states may be defined by the ACPI Revision 3.0a, Dec. 30, 2005 (the "ACPI Revision 3.0a Specification"). The ACPI series of specifications define multiple power states for electronic devices, such as global system states (Gx states), device power states (Dx states), sleeping states (Sx states), processor power states (Cx states), device and processor performance states (Px states), and so forth. It may be appreciated that other power states of varying power levels may be implemented as desired for a given set of design parameters and performance constraints. The embodiments are not limited in this context.

In some embodiments, the various electrical or electronic elements of the nodes 110-1-$m$ suitable for power management operations may be generally grouped or organized into the communications sub-system 210 and the computing sub-system 230. It may be appreciated, however, that the sub-systems 210, 230 are provided by way of example for purposes of clarity and not limitation, and the managed power system 120 may include other electrical or electronic elements of the nodes 110-1-$m$ suitable for power management operations by the power management module 130. For example, the nodes 110-1-$m$ may typically include a computer monitor or display, such as a digital electronic display or an analog electronic display. Examples of digital electronic displays may include electronic paper, nixie tube displays, vacuum fluorescent displays, light-emitting diode displays, electroluminescent displays, plasma display panels, liquid crystal displays, thin-film transistor displays, organic light-emitting diode displays, surface-conduction electron-emitter displays, laser television displays, carbon nanotubes, nanocrystal displays, and so forth. An example for analog electronic displays may include cathode ray tube displays. Computer monitors are often placed in a sleep mode when an operating system detects that the computer system has not received any input from a user for a defined period of time. Other system components may include digital cameras, touch screens, video recorders, audio recorders, storage devices, vibrating elements, oscillators, system clocks, controllers, and other platform or system architecture equipment. These other system components can also be placed in a sleep or powered down state in order to conserve energy when the components are not in use. The computer system monitors input devices and wakes devices as needed. The embodiments are not limited in this context.

In various embodiments, the managed power system 120 may include the communications sub-system 210. The communications sub-system 210 may comprise various communications elements arranged to communicate information and perform communications operations between the nodes 110-1-$m$. Examples of suitable communications elements may include any electrical or electronic element designed to communicate information over the communications links 140-1, 140-2, including without limitation radios, transmitters, receivers, transceivers, chipsets, amplifiers, filters, control logic, interfaces, network interfaces, network interface cards (NICs), antennas, antenna arrays, digital signal processors, baseband processors, media access controllers, memory units, and so forth.

In various embodiments, the communications sub-system 210-1 may include one or more transceivers 204-1-$r$ capable of operating at different communications rates. The transceivers 204-1-$r$ may comprise any communications elements capable of transmitting and receiving information over the various wired media types (e.g., copper, single-mode fiber, multi-mode fiber, etc.) and wireless media types (e.g., RF spectrum) for communications link 140-1, 140-2. Examples of the transceivers 204-1-$r$ may include various Ethernet-based PHY devices, such as a Fast Ethernet PHY device (e.g., 100 Base-T, 100 Base-TX, 100 Base-T4, 100 Base-T2, 100 Base-FX, 100 Base-SX, 100 BaseBX, and so forth), a Gigabit Ethernet (GbE) PHY device (e.g., 1000 Base-T, 1000 Base-SX, 1000 Base-LX, 1000 Base-BX10, 1000 Base-CX, 1000 Base-ZX, and so forth), a 10 GbE PHY device (e.g., 10 GBase-SR, 10 GBase-LRM, 10 GBase-LR, 10 GBase-ER, 10 GBase-ZR, 10 GBase-LX4, 10 GBase-CX4, 10 GBase-Kx, 10 GBase-T, and so forth), a 100 GbE PHY device, and so forth. The transceivers 204-1-$r$ may also comprise various radios or wireless PHY devices, such as for mobile broadband communications systems. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. The transceivers 204-1-$r$ may also be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multi-plexing (OFDM) Packet Access (HSOPA) system series of standards and variants, a High-Speed Uplink Packet Access (HSUPA) system series of standards and variants, and so forth. The embodiments are not limited in this context.

In various embodiments, a controller 208 may be operative to switch communications rates using a single transceiver (e.g., 204-1) or multiple transceivers 204-1-$r$. The controller 208 may be implemented as any computing elements or logic device capable of executing logical operations, such as processors, microprocessors, chipsets, controllers, microcontrollers, embedded controllers, media access controller, baseband controller, and so forth. The transceivers 204-1-$r$ may individually or collectively operate at different communications rates or link rates. In one embodiment, for example, a single transceiver 204-1 may be capable of operating at various communications rates. In another embodiment, for example, a first transceiver 204-1 may be capable of operating at a first communications rate, a second transceiver 204-2 may be capable of operating at a second communications rate, and so forth. The controller 208 may switch the first transceiver 204-1 from a first communications rate to a second communications rate, or switch operations from the first transceiver 204-1 to a second transceiver 204-2, to achieve the desired communications rate. The controller 208 may switch communications rates in accordance with a control policy, such as one or more Energy Efficient Ethernet (EEE) control policies, for example. The controller 208 may also switch communications rates in accordance with instructions from a buffer manager 216.

In various embodiments, the communications sub-system 210-1 may include one or more buffers 206-1-$t$ managed by a buffer manager 216. The buffers 206-1-$t$ may be operative to store network packets received by the transceivers 204-1-$r$, or ready for transmission by the transceivers 204-1-$r$. For example, the buffers 206-1-$t$ may be used to buffer packets when the communications sub-system 210-1 or the computing sub-system 230-1 enters a lower power state and is therefore unable to communicate or process the packets. In another example, the buffers 206-1-$t$ may be used to buffer packets until the communications rate for the transceiver has been completely switched or modified since switching communications rates for the transceivers 204-1-$r$ is typically not instantaneous. The buffers 206-1-$t$ may be implemented, for example, as standard First-In-First-Out (FIFO) queues. The buffer manager 216 may implement various types of buffer logic to manage operations for the buffers 201-1-$t$.

In various embodiments, the managed power system 120 may include the computing sub-system 230. The computing sub-system 230 may comprise various computing elements arranged to process information and perform computing operations for the nodes 110-1-$m$. Examples of suitable computing elements may include any electrical or electronic element designed to process information, including without limitation processors, microprocessors, chipsets, controllers, microcontrollers, embedded controllers, clocks, oscillators, audio cards, video cards, multimedia cards, peripherals, memory units, memory controllers, video controllers, audio controllers, multimedia controllers, and so forth.

In various embodiments, the power management module 130 may comprise a power source 232. The power source 232 may be arranged to provide power to the elements of a node 110-1-$m$ in general, and the managed power system 120 in particular. In one embodiment, for example, the power source 232 may be operative to provide varying levels of power to the communications sub-system 210 and the computing sub-system 230. In various embodiments, the power source 232 may be implemented by a rechargeable battery, such as a removable and rechargeable lithium ion battery to provide direct current (DC) power, and/or an alternating current (AC) adapter to draw power from a standard AC main power supply.

In various embodiments, the power management module 130 may include a power management controller 234. The power management controller 234 may generally control power consumption by the managed power system 120. In one embodiment, the power management controller 234 may be operative to control varying levels of power provided to the communications sub-system 210 and the computing sub-system 230 in accordance with certain defined power states. For example, the power management controller 234 may modify, switch or transition the power levels provided by the power source 232 to the sub-systems 210, 230 to a higher or lower power level, thereby effectively modifying a power state for the sub-systems 210, 230.

In various embodiments, the power management module 130 may include one or more power control timers 236. The power control timer 236 may be used by the power management controller 234 to maintain a certain power state for a given power state duration period. The power state duration period may represent a defined time interval a node or portion of a node is in a given power state. For example, the power management controller 234 may switch the computing sub-system 230 from a higher power state to a lower power state for a defined time interval, and when the time interval has expired, switch the computing sub-system 230 back to the higher power state.

In order to coordinate power management operations for a node 110-1-$m$, the communications sub-system 210, the computing sub-system 230, and the power management module 130 may communicate various power management messages 240-1-$q$ via a communications bus 220 and the respective power management interfaces 214-1, 214-2, and 214-3. To manage power for all the devices in a system, an operating system typically utilizes standard techniques for communicating control information over a particular Input/Output (I/O) interconnect. Examples of various I/O interconnects suitable for implementation as the communications bus 220 and associated interfaces 214 may include without limitation Peripheral Component Interconnect (PCI), PCI Express (PCIe), CardBus, Universal Serial Bus (USB), IEEE 1394 FireWire, and so forth.

Referring again to FIG. 2, the communications sub-system 210 may include a network state module 212. The network state module 212 may be arranged to monitor certain states or characteristics of the communications sub-system 210, such as the traffic activity of the communications connections 250-1-$v$, capabilities information, and other operations for the various communications elements of the communications sub-system 210. The network state module 212 may send communications power management messages 240-1-$q$ to the power management module 130 with the measured characteristics. The power management module 130 may generate power state information 260 for the managed power system 120 based in part on the communications power management messages 240-1-$q$.

Similarly, the computing sub-system 230 may include a computing state module 232. The computing state module 232 may be arranged to monitor certain states or characteristics of the computing sub-system 230, such as the level of system activity, capabilities information, and other operations for the various computing elements of the computing sub-system 230. The computing state module 232 may send computing power management messages 240-1-$q$ to the power management module 130 with the measured characteristics. The power management module 130 may generate power state information 260 for the managed power system 120 based in part on the computing power management messages 240-1-$q$.

In general operation, the power management module 130-1 may perform power management operations for portions of the managed power system 120-1 of the node 110-1 based on power state information received from other portions of the first node 110-1. In some cases, for example, the power management module 130-1 for the node 110-1 may be operative to receive communications power state information from the network state module 212 of the communications sub-system 210-1 for the managed power system 120-1 over the communications bus 220. The power management module 130-1 may manage various power states for the computing subsystem 230-1 of the managed power system 120-1 for the node 110-1 based on the communications power state information for the communications sub-system 210-1. The power management module 130-1 and the sub-systems 210-1, 230-1 may communicate the communications power state information over the communications bus 220 in accordance with various communications bus protocols.

The communications power state information may represent information explicitly or implicitly related to power states for the communications sub-system 210. The communications power state information may also represent various characteristics or attributes for the power states of the communications sub-system 210, such as such as power state duration periods, idle durations, resume latencies, and so forth. In one embodiment, for example, the communications power state information may include without limitation a communications power state parameter, a communications idle duration parameter, a communications resume latency parameter, or a power state duration period. The communications idle duration parameter represents an amount of time, or defined time interval, the network link or communications sub-system 210-1 will remain in a given power state. The communications idle duration parameter allows the sub-systems 210-1, 230-1 to enter and exit the lower power states with a deterministic manner. The communications resume latency parameter represents an amount of time, or defined time interval, the network link or communications sub-system 210-1 needs to exit a given power state and enter a higher power state. The communications resume latency parameter allows the sub-systems 210-1, 230-1 to determine how soon it can expect the communications sub-system 210-1 to wake up and be ready for providing services such as out-going transmission. The communications idle duration parameter and the communications resume latency parameter may be communicated by the power management messages 240-1-$q$ over the communications bus 220.

In various embodiments, the network state module 212 may be arranged to generate the communications idle duration parameter and the communications resume latency parameter based on the capabilities of the communications sub-system 210-1. For example, the communications sub-system 210-1 may implement various buffers to store information received from the communications connections 250-1-$v$, such as network packets, and forward the information for servicing and processing by the computing sub-system 230-1. In another example, the communications sub-system 210-1 may also implement various buffers to store information received from the communications bus 220, such as network packets, and forward the information for communications by the communications sub-system 210-1 to other nodes 110-2-$m$ over the communications connections 250-1-$v$ via the communications links 140-1, 140-2. In yet another example, the communications sub-system 210-1 may include various wired or wireless transceiver operating at different communications speeds, such as the IEEE 802.3-2005 standard 10 Gigabit Ethernet 10 GbE or 10 GigE), the IEEE 802.3ba proposed standard 100 Gigabit Ethernet (100 GbE or 100 GigE), and so forth. In still another example, the communications sub-system 210-1 may include various processors operating at different speeds, such as baseband or communications processor. In still another example, the network state module 212 may monitor the rate of information being received over the communications connections 250-1-$v$ via the communications links 140-1, 140-2. In this example, the network state module 212 of the communications sub-system 210-1 may monitor the communications links 140-1, 140-2 to measure packet inter-arrival times. Other examples of communications capabilities may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state information 260 for other nodes 110-2-$m$ received via one or more PMPDU 150-1-$s$, and so forth. The network state module 212 may evaluate these and other network or communications capabilities of the communications sub-system 210-1, and generate the appropriate communications idle duration parameter and the communications resume latency parameter based on the evaluated capabilities of the communications sub-system 210-1.

In various embodiments, the nodes 110-1-$m$ may use the communications power state information to enhance power management operations for a given node 110-1-$m$ to improve energy conservation (e.g., increase battery life or decrease battery size), heat dissipation or overall system performance. In one embodiment, for example, the network state module 212 of the communications sub-system 210-1 may monitor the communications links 140-1, 140-2 and various communications elements (e.g., radio, baseband processor, chipset, memory units, etc.) to determine communications power state information for the communications sub-system 210-1. The network state module 212 may send a power management message 240-1-$q$ with the communications power state information over the communications bus 220 and interfaces 214-1, 214-3 to the power management module 130-1. The power management module 130-1 may receive the power management message 240-1-$q$, and retrieve the communications power state information from the power management message 240-1-$q$. The power management module 130-1 may manage power states for the computing sub-system 230-1 based on the communications power state information for the communications sub-system 210-1. For example, the power management module 130-1 may modify a power level for a computing sub-system 230-1 of the managed power system 120-1 from a first power level to a second power level using the communications power state information for the communications sub-system 210-1. Furthermore, the power management module 130-1 may modify the power level for the computing sub-system 230-1 from a first power level to a second power level for a defined time interval, referred to as a power state duration period, as determined using the communications power state information for the communications sub-system 210-1.

Whenever the communications sub-system 210-1 has been placed in a lower power state, however, the communications sub-system 210-1 may still continue to receive packets of information from other nodes 110-2-$m$ over the communications links 140-1, 140-2, as well as packets of information from the computing sub-system 230-1 ready for transmit by the communications sub-system 210-1 to other nodes 110-2-$m$ over the communications links 140-1, 140-2. If every packet received by the communications sub-system 210-1 were sent directly to the computing sub-system 230-1 for processing, the computing sub-system 230-1 would continually need to exit a lower power state and enter and higher power state to process each packet. This may consume significant amounts of energy from the power source 232.

To solve these and other problems, the communications sub-system 210-1 may implement interrupt coalescing techniques. For example, the communications sub-system 210-1 may be arranged to store or buffer incoming packets using one or more of the buffers 206-1-$t$, and the buffer manager 216 may determine when to release or transfer the stored packets to the computing sub-system 230-1 for processing. The buffer manager 216 may determine when to transfer the packets from the buffers 206-1-*t* to the computing sub-system 230-1 in accordance with a buffer management policy designed to increase energy conservation for the computing sub-system 230-1, and therefore the overall node 110-1.

In various embodiments, the buffer manager 216 may implement a buffer management policy designed to allow the communications sub-system 210-1 and/or the computing sub-system 230-1 to enter and stay in a lower power state for a longer period of time, while maintaining QoS, throughput and other performance requirements for the communications sub-system 210-1 and/or the computing sub-system 230-1. In some embodiments, the buffer management policy may include various buffer management rules to determine when to transfer the packets from the buffers 206-1-*t* to the computing sub-system 230-1. In one embodiment, for example, the buffer manager 216 may implement a buffer management rule to store packets in the buffers 206-1-*t* during a communications idle duration period, and transfer the stored packets from the buffers 206-1-*t* to the computing sub-system 230-1 when any combination of four buffer management conditions are satisfied, including: (1) when a number of packets stored by one or more buffers 206-1-*t* exceeds a variable receive threshold value; (2) when a buffer unload timeout value expires; (3) when a buffer unload event signal is received; and/or (4) when a communications idle duration parameter is less than a communications idle duration threshold value. It may be appreciated that these 4 buffer management conditions are provided by way of example and not limitation. The embodiments are not limited in this context.

The buffer manager 216 may utilize one or more of the buffer management conditions, in various combinations, to trigger a release or transfer of any packets stored within the buffers 206-1-*t* to the computing sub-system 230-1 for processing. In one embodiment, for example, the buffer manager 216 may transfer the packets stored within the buffers 206-1-*t* to the computing sub-system 230-1 utilizing a direct memory access (DMA) technique to accelerate movement of the packets from the buffers 206-1-*t* to the memory units 234 used by the computing sub-system 230-1. The buffer manager 216 may then issue an interrupt to the computing sub-system 230-1 (e.g., a processor) to indicate packets are in the memory units 234 and ready for processing by the computing sub-system 230-1.

In one embodiment, the buffer manager 216 transfer the stored packets from the buffers 206-1-*t* to the computing sub-system 230-1 when a number of packets stored by one or more buffers 206-1-*t* exceeds a variable receive threshold value. For example, the communications sub-system 210-1 may include a watermark generator 217 coupled to the buffer manager 216 and the buffers 206-1-*t*. The watermark generator 217 may be operative to generate a variable receive threshold value. The variable receive threshold value may comprise a defined threshold value or watermark for the buffers 206-1-*t*. The variable receive threshold value may be calculated, derived or otherwise determined as a function with at least three inputs, including: (1) a receive data rate parameter; (2) a buffer size parameter; and (3) a communications resume latency parameter. The receive data rate parameter may represent a communications rate for one or more transceivers 204-1-*r*. The buffer size parameter may represent a size for one or more buffers 206-1-*t*. The communications resume latency parameter may represent an amount of time, or defined time interval (e.g., 1 ms), the network link or communications sub-system 210-1 needs to exit a given power state and enter a higher power state. Utilizing these or other communications parameters, the watermark generator 217 may periodically, continuously or on-demand generate the variable receive threshold value, thereby ensuring the variable receive threshold accurately reflects changing communications rates, latencies and other network traffic considerations. The buffer manager 216 may receive the variable receive threshold value from the watermark generator 217 and a current buffer utilization parameter from the buffers 206-1-*t*, compare the current buffer utilization parameter with the variable receive threshold value, and initiate a DMA transfer based on the comparison results. For example, the buffer manager 216 may initiate the DMA transfer when a number of packets of information stored by the buffer exceeds a variable receive threshold value.

In one embodiment, the buffer manager 216 may transfer the stored packets from the buffers 206-1-*t* to the computing sub-system 230-1 when a buffer unload timeout value expires. For example, the communications sub-system 210-1 may include a buffer timer 218 to couple to the buffer manager 216. The buffer timer 218 may be a hardware or software timer used to time or measure a defined time interval. For example, the buffer timer 218 may be set or loaded with a buffer unload timeout value. The buffer timer 218 may monitor or perform a count down until the buffer unload timeout value expires. The buffer manager 216 may be arranged to transfer the stored packets of information from the buffers 206-1-*t* to the computing sub-system 230-1 when the buffer unload timeout value expires. When used in combination with another buffer management condition, such as the variable receive threshold value, the buffer manager 216 may transfer the stored packets when the buffer unload timeout value expires before a number of packets stored by the buffers 206-1-*t* exceeds the variable receive threshold value.

In one embodiment, the buffer manager 216 may transfer the stored packets from the buffers 206-1-*t* to the computing sub-system 230-1 when a buffer unload event signal is received by the buffer manager 216. For example, the communications sub-system 210-1 may randomly receive event signals from various portions of the node 110-1 that merits the buffer manager 216 to transfer the packets from the buffers 206-1-*t* to the computing sub-system 230-1. For example, assume the computing sub-system 230-1 implements a chipset computer architecture that includes a memory controller hub (MCH) and an input/output (I/O) controller hub (ICH), such as the "northbridge" and "southbridge" controller hubs made by Intel® Corporation, Santa Clara, Calif. Further assume the MCH and ICH communicate information using a direct media interface (DMI) and associated link. As with other portions of the computing sub-system 230-1, the DMI link may be placed in various power states, such as a higher power state L0 and a lower power state L1. When the DMI link exits from the lower power state L1 to the higher power state L0 due to activities by other devices, the computing sub-system 230-1 may send a buffer unload event signal to the buffer manager 216. The buffer unload event signal may indicate to the buffer manager 216 that the computing sub-system 230-1 is already in a higher power state and active, and therefore the buffer manager 216 may opportunistically use the higher power state of the computing sub-system 230-1 to transfer the packets from the buffers 206-1-*t* to the memory 234. When used in combination with another buffer management condition, such as the variable receive threshold value, the buffer manager 216 may transfer the stored packets when it receives a buffer unload event signal before a number of packets stored by the buffer 206-1-*t* exceeds the variable threshold value.

In one embodiment, the buffer manager 216 may implement a buffer management rule to transfer the stored packets from the buffers 206-1-$t$ to the computing sub-system 230-1 when a communications idle duration parameter is less than a communications idle duration threshold value. The communications idle duration threshold value may comprise a defined threshold value for the communications idle duration parameter. Typically, the higher the communications idle duration parameter, the lower the communications rates for data coming over the communications links 140-1, 140-2, and vice-versa. The communications idle duration threshold value is configurable, and may be set to determine when the communications idle duration parameter is low enough to indicate a high enough communications rate that will not necessarily tolerate any additional latencies introduced by the buffers 206-1-$t$. The buffer manager 216 may be arranged to disable one or more of the buffers 206-1-$t$ to prevent the buffers 206-1-$t$ from storing the packets of information when the communications idle duration parameter is lower than a communications idle duration threshold value.

In some embodiments, the buffer manager 216 may be arranged to issue signals to the controller 208 to modify communications rates for the transceivers 204-1-$r$. For example, the buffer manager 216 may instruct the controller 208 to modify communications rates based on its FIFO size and/or energy left. In one embodiment, for example, the buffer manager 216 may receive or maintain a buffer size parameter, an energy measurement parameter, or both parameters. The buffer size parameter may represent a FIFO size or FIFO remaining capacity. The energy measurement parameter may represent an amount of energy remaining for a power source, such as the power source 232. The buffer manager 216 may be arranged to send a request to the controller 208 to adjust a communications rate for the transceivers 204-1-$r$ based on the buffer size parameter. Similarly, the buffer manager 216 may be arranged to receive a power management message with an energy measurement parameter from the power management controller 234, and send a request to adjust a communications rate for the transceivers 204-1-$r$ based on the energy measurement parameter.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 300 is described with reference to FIGS. 1-2.

The logic flow 300 may illustrate various operations for the nodes 110-1-$m$ in general, and the managed power system 120 and the power management module 130 in particular. As shown in FIG. 3, the logic flow 300 may modify a power state for a communications sub-system and a computing sub-system from a higher power state to a lower power state at block 302. The logic flow 300 may store packets of information in a buffer for the communications sub-system during a communications idle duration period to create a computing idle duration period at block 304. The logic flow 300 may generate a variable receive threshold value for the buffer at block 306. The logic flow 300 may transfer the stored packets of information from the buffer to the computing sub-system based on a variable receive threshold value at block 308. The embodiments are not limited in this context.

In one embodiment, the logic flow 300 may modify a power state for a communications sub-system and a computing sub-system from a higher power state to a lower power state at block 302. For example, the power management controller 234 may receive power management messages 240-1-$q$ with computing power state information generated by the computing state module 232 and communications power state information generated by the network state module 212. The power management controller 234 may receive the power management messages 240-1-$q$ from the communications bus 220 via the interfaces 214-1, 214-2 and 214-3. The power management controller 234 may process the power management messages 240-1-$q$, and determine an appropriate communications power state (e.g., NL0, NL1, NL2, etc.) and an appropriate computing power state (e.g., S0, S0$i$1, S0$i$2, S0$i$3, S4, etc.). The power management controller 234 may send the communications power state and the computing power state to the respective sub-systems 210-1, 210-2 via power management messages 240-1-$q$ over the communications bus 220 and interfaces 214-1, 214-2 and 214-3, and the sub-systems 210-1, 210-2 may modify their respective power states accordingly.

In one embodiment, the logic flow 300 may store packets of information in a buffer for the communications sub-system during a communications idle duration period to create a computing idle duration period at block 304. The communications idle duration period, for example, may refer to a time interval when the communications sub-system 210-1 does not receive (or expect to receive) information from a network over the communications links 140-1, 140-2. The computing idle duration period, for example, may refer to a time interval when the computing sub-system 230-1 does not receive (or expect to receive) information from the communications sub-system 210-1. By way of example, the communications sub-system 210-1 may receive the communications idle duration parameter from the power management messages 240-1-$q$ for the communications sub-system 210-1 sent by the power management controller 234. In this case, the communications idle duration parameter may be calculated by the power management controller 234 using the power state information received from the sub-systems 210-1, 230-1. In another example, the communications sub-system 210-1 may receive the communications idle duration parameter from the network state module 212. In either case, the communications sub-system 210-1 may enter a lower power state indicated by the communications power state for a time interval defined by the communications idle period parameter. The lower power state may be entered directly by reducing power to all communications elements for the communications sub-system 210-1, or indirectly by modifying a communications rate for the transceivers 204-1-$r$. Once the communications sub-system 210-1 enters the lower power state, the buffer manager 216 may store packets of information in one or more receive buffers 206-1-$t$ for the communications sub-system 210-1— during a communications idle duration period defined by the communications idle duration parameter, thereby creating a computing idle duration period for the computing sub-system 230-1. In some cases, the communications sub-system 210-1 may communicate the computing idle duration period to the computing sub-system 230-1 so that the computing sub-system 230-1 may operate accordingly, such as switching to a lower power state for a time interval corresponding to the expected computing idle duration period.

In one embodiment, the logic flow 300 may generate a variable receive threshold value for the buffer at block 306. For example, the watermark generator 217 may receive a receive data rate parameter, a buffer size parameter, and/or a communications resume latency parameter, and generates a variable receive threshold value (e.g., buffer watermark) for the receive buffers 206-1-*t* based on these parameters. The watermark generator 217 may output the variable receive threshold value to the buffer manager 216.

In one embodiment, the logic flow 300 may transfer the stored packets of information from the buffer to the computing sub-system based on a variable receive threshold value at block 308. For example, the buffer manager 216 may receive the variable receive threshold value from the watermark generator 217, set the buffers 206-1-*t* with the variable receive threshold value, and may periodically or aperiodically compare a number of packets of information stored by the receive buffers 206-1-*t* with the variable receive threshold value. When a number of packets of information stored by the receive buffers 206-1-*t* meets or exceeds the variable receive threshold value, the buffer manager may transfer the contents of the receive buffers 206-1-*t* to the memory units 234 of the computing sub-system 230 via a DMA transfer for further processing.

Figure 4:
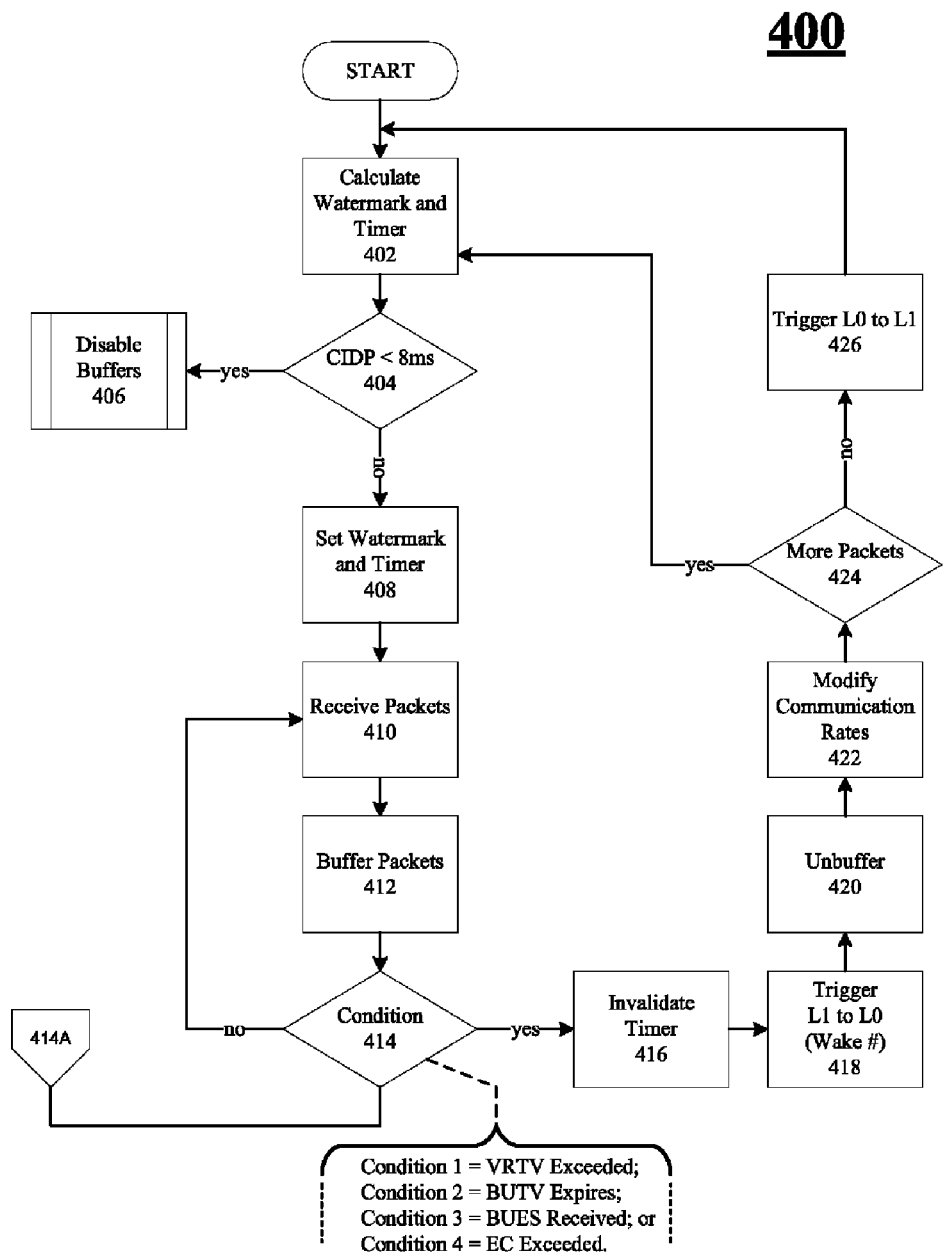
FIG. 4 illustrates one embodiment of a second logic diagram.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., instructions, data, and/or code) to be executed by a logic device. For purposes of illustration, and not limitation, the logic flow 400 is described with reference to FIGS. 1-2.

The logic flow 400 may illustrate various operations for the nodes 110-1-*m* in general, and the managed power system 120 and the power management module 130 in particular. As shown in FIG. 4, the logic flow 400 begins at block 402 by having the watermark generator 217 calculating or re-calculating a variable receive threshold value (e.g., buffer watermark) with a receive data rate parameter, a buffer size parameter, and/or a communications resume latency parameter, and then configures the buffer watermark trigger. This allows the buffer manager 216 to react to various link speeds and delays. The buffer manager 216 may utilize a communications idle duration parameter to determine how long the communications sub-system 210-1 and/or the computing sub-system 230-1 may remain in a lower power state. Since there is no incoming traffic expected during the communications idle duration parameter, the sub-systems 210-1, 230-1 can be power-gated provided there is sufficient time that discrete elements for the sub-system 210-1, 230-1 can do so economically. For example, communications elements such as transceivers 204-1-*r* implemented as wireless transceivers typically require a communications idle duration parameter of at least 8 ms to move to a lower power state. When the communications idle duration parameter is below 8 ms, this scenario implies a higher data rate for incoming traffic. Based on this assumption, when the communications idle duration parameter is determined to be less than 8 ms at diamond 404, then the buffers 206-1-*t* are disabled at block 406 to eliminate the additional delay (latency) that the buffers 206-1-*t* might introduce. When the communications idle duration parameter is determined to be greater than 8 ms at diamond 404, however, then the buffer manager 216 may set the variable receive threshold value for the buffers 206-1-*t* and buffer unload timeout value for the buffer timer 218 at block 408.

The buffer manager 216 may begin receiving packets from one or more of the transceivers 204-1-*r* at block 410, and buffering the received packets in one or more of the buffers 206-1-*t* at block 412, until one or more of the buffer management conditions become TRUE at diamond 414. In one embodiment, for example, the diamond 414 may evaluate at least 4 conditions, including whether: (1) a first condition (Condition 1) is TRUE based on exceeding a variable receive threshold value; (2) a second condition (Condition 2) is TRUE based on expiration of a buffer unload timeout value; (3) a third condition (Condition 3) is TRUE based on receiving a buffer unload event signal; and (4) a fourth condition (Condition 4) is TRUE based on exceeding an event counter. In the third condition (Condition 3), for example, the buffer manager 216 can utilize various system events (e.g., a transmit interrupt) from the driver, or a DMI link state between the ICH and MCH, as an input to trigger the un-buffering of the packets from a receive buffer 206-1-*t*. For example, when the DMI exits from L1 to L0 due to activities from other devices, it signals to the communications sub-system 210-1 that the host system is already active, and therefore the buffer manager 216 should take advantage of the opportunity to un-buffer the buffered packets from the buffers 206-1-*t* if possible. The fourth condition (Condition 4) may be described in more detail with reference to FIG. 5 as indicated by off page reference 414*a*.

When one of the four conditions tested at diamond 414 is TRUE, the buffer manager 216 invalidates the buffer timer 218 (e.g., when armed) at block 416, and triggers the DMI link to exit the lower power state L1 and enter the higher power state L0 at block 418. The buffer manager 216 unbuffers the packets by transferring the packets from the buffers 206-1-*t* to the memory units 234 of the computing sub-system 230-1 using a DMA transfer, and issues an interrupt for the computing sub-system 230-1, at block 420. The buffer manager 216 may optionally modify a communications rate for the transceivers 204-1-*r* to either increase or decrease the rate of incoming packets based on its FIFO size and/or amount of energy remaining at block 422.

The buffer manager 216 may determine whether more packets have arrived within a stay-awake timer at diamond 424. The buffer manager 216 may keep a timestamp of the last packet. When the timestamp minus the current time is less than a stay-awake timer, then the network is presumed busy. In this case, the buffer manager 216 will continue operations at block 402. When the timestamp minus the current time is more than the stay-awake timer, then the network is presumed idle. In this case, the buffer manager 216 triggers the DMI link to exit the higher power state L0 and enter the lower power state L1 at block 426, and continues operations at block 402.

Referring again to diamond 414, one of the conditions the buffer manager 216 evaluates may include the fourth condition (Condition 4) sometimes referred to as a "Fail-Safe" trigger. The Fail-Safe trigger is designed to avoid a recurring condition where a small number of packets (or a single packet) remain in a buffer 206-1-*t* until the buffer timer 218 expires. The buffer manager 216 may detect this condition by monitoring how many times a single packet is inside a buffer 206-1-*t* when the buffer timer 218 expires. For example, if this condition happens more than a certain number of times (e.g., 3), then the buffer manager 216 may temporarily disable the buffers 206-1-*t* until a configurable number of resume conditions occur thereby indicating the buffers 206-1-*t* should be enabled or re-enabled. Examples for resume conditions may include: (1) timer-based such as enable buffers 206-1-*t* after a defined time interval (e.g., 10 seconds); and (2) packet-count-based such as enable buffers 206-1-*t* after a defined number of packets have been received (e.g., 4000 packets). An example logic flow to evaluate the fourth condition may be described in more detail with reference to FIG. 5.

Figure 5:
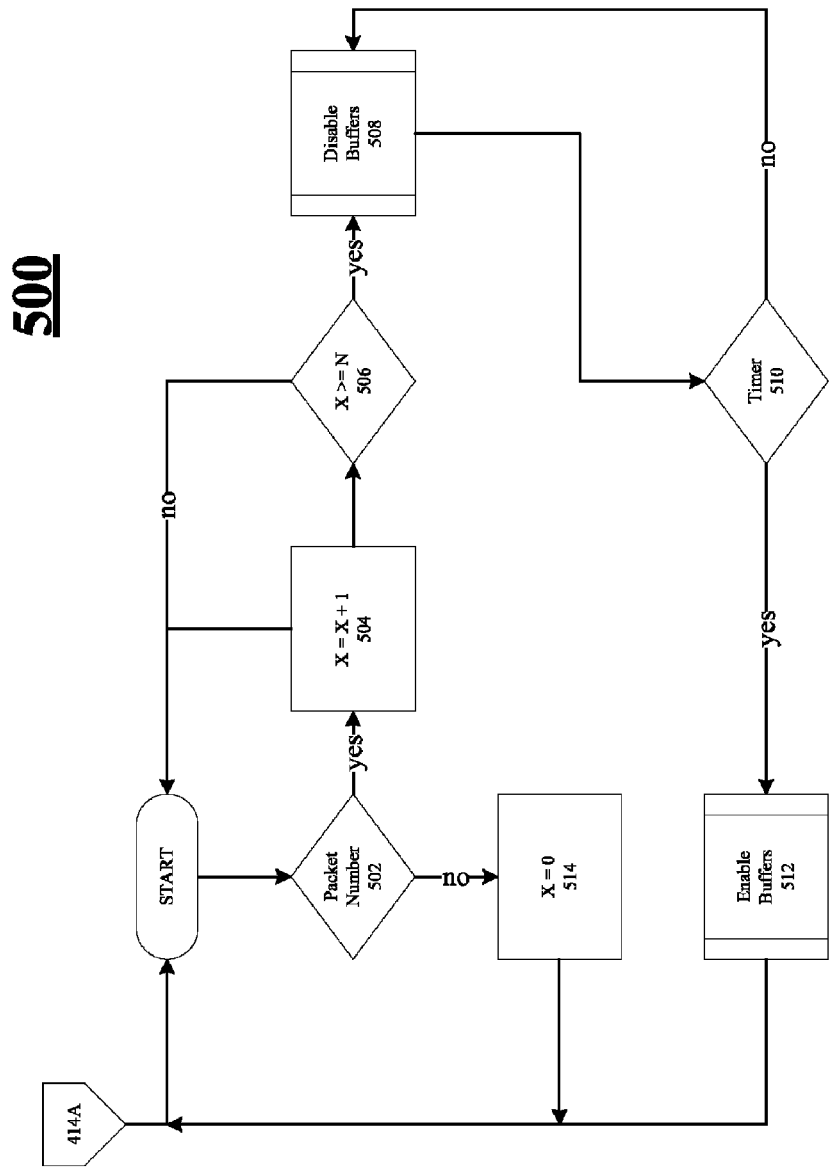
FIG. 5 illustrates one embodiment of a third logic diagram.

FIG. 5 illustrates a logic flow 500 in accordance with one or more embodiments. The logic flow 500 may be performed by various systems and/or devices and may be implemented as hardware, software, and/or any combination thereof, as desired for a given set of design parameters or performance constraints. For example, the logic flow 500 may be implemented by a logic device (e.g., processor) and/or logic (e.g., instructions, data, and/or code) to be executed by a logic device. For purposes of illustration, and not limitation, the logic flow 500 is described with reference to FIGS. 1-2.

The logic flow 500 may illustrate various operations for the nodes 110-1-*m* in general, and the managed power system 120 and the power management module 130 in particular. The logic flow 500 may provide an example of a logic flow to evaluate the fourth condition (Condition 4) at block 414 described with reference to FIG. 4 as indicated by the off page reference 414*a*. To implement the fourth condition (Condition 4), the buffer manager 216 may implement an event counter that counts a number of times a certain event occurs (X). The event may comprise a case where there is only a limited number of packets (e.g. 1) in a buffer 206-1-*t* when the buffer unload timeout value expires. When the event counter counts the occurrence of the event (X) more than an event threshold value (N) (e.g., N=3), the buffer manager 216 may temporarily disable the buffers 206-1-*t* until the resume conditions are met.

In one embodiment, for example, the buffer manager 216 may implement a packet counter to count a number of packets in a buffer 506-1-*t* (M), and set the buffer timer 218 with a buffer disable timeout value (B). As shown in FIG. 5, when M is not equal to a packet threshold value (e.g., M>1) at diamond 502, then the buffer manager 216 resets an event counter (e.g., X=0) at block 514 and passes control to block 416 of the logic flow 400. When M is equal to a packet threshold value (e.g., M=1) at diamond 502, however, then the buffer manager 216 increments the event counter by one (e.g., X=X+1) at block 504. The buffer manager 216 may determine whether the event counter (X) is greater than or equal to the event threshold value (e.g., N=3) at diamond 506. When FALSE at diamond 506, the buffer manager 216 restarts at block 502. When TRUE at diamond 506, the buffer manager 216 disables the buffers 206-1-*t* at block 508. The buffer manager 216 then determines if a resume condition occurs, such as the buffer timer 218 is greater than the buffer disable timeout value (e.g., timer>L seconds) or the number of packets received since the buffers 206-1-*t* were disabled is greater than packet threshold value (e.g., P>4000 packets). When both of the resume conditions are FALSE, then control is passed back to block 508. When either of the resume conditions is TRUE, however, then the buffer manager 216 enables the buffers 206-1-*t* at block 510, and passes control to block 416 of the logic flow 400. It is worthy to note that the values for M, N, L and P are configurable values.

The various embodiments may provide several advantages for multiple use scenarios and applications. In one embodiment, for example, the buffer manager 216 and the buffers 206-1-*t* may be used to allow the computing sub-system 230-1 to remain in a lower power state, thereby increasing energy conservation. In one embodiment, for example, approximately 500 milliwatts (mW) to 2 Watts (W) of power savings may be achieved for active communications scenarios.

In some cases, various embodiments may be implemented as an article of manufacture. The article of manufacture may include a computer-readable medium or storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Examples of what could be claimed include the following:

The invention claimed is:

1. An apparatus, comprising:
a power management module having a power management controller, the power management controller to couple to a transceiver;
a managed power system to couple to the power management module, the managed power system comprising a communications sub-system and a computing sub-system, the power management controller to switch the communications sub-system and the computing sub-system from a higher power state to a lower power state to conserve energy, the communications sub-system having:
the transceiver;
a buffer to couple to the transceiver, the buffer to store packets of information for the transceiver during a communications idle duration period to create a computing idle duration period;
a watermark generator to couple to the buffer, the watermark generator operative to generate a variable receive threshold value; and
a buffer manager to couple to the buffer and the watermark generator, the buffer manager operative to transfer the stored packets of information from the buffer to the computing sub-system based on the variable receive threshold value, to receive a power management message with an energy measurement parameter from the power management controller, and send a request to adjust a communications rate for the transceiver based on the energy measurement parameter.

2. The apparatus of claim 1, the buffer manager operative to transfer the stored packets of information from the buffer to the computing sub-system when a number of packets of information stored by the buffer exceeds the variable receive threshold value.

3. The apparatus of claim 1, the watermark generator operative to generate the variable receive threshold value based on a receive data rate parameter, a buffer size parameter and a communications resume latency parameter.

4. The apparatus of claim 1, the buffer manager operative to disable the buffer to prevent the buffer from storing the packets of information when a communications idle duration parameter is lower than a communications idle duration threshold value.

5. The apparatus of claim 1, comprising a buffer timer to couple to the buffer manager, the buffer timer set with a buffer unload timeout value, the buffer manager operative to transfer the stored packets of information from the buffer to the computing sub-system when the buffer unload timeout value expires before a number of packets stored by the buffer exceeds the variable receive threshold value.

6. The apparatus of claim 1, the buffer manager operative to receive a buffer unload event signal before a number of packets stored by the buffer exceeds the variable threshold value, and transfer the stored packets of information from the buffer to the computing sub-system in response to the buffer unload event signal.

7. The apparatus of claim 1, comprising the power management controller to couple to the transceiver, the buffer manager operative to send a request to adjust a communications rate for the transceiver based on a buffer size parameter.

8. A method, comprising:
modifying a power state for a communications sub-system and a computing sub-system from a higher power state to a lower power state;
storing packets of information in a buffer for the communications sub-system during a communications idle duration period to create a computing idle duration period;
generating a variable receive threshold value for the buffer;
transferring the stored packets of information from the buffer to the computing sub-system based on the variable receive threshold value;
receiving a power management message with an energy measurement parameter; and
sending a request to adjust a communications rate based on the energy measurement parameter.

9. The method of claim 8, comprising transferring the stored packets of information from the buffer to the computing sub-system when a number of packets of information stored by the buffer is greater than the variable receive threshold value.

10. The method of claim 8, comprising generating the variable receive threshold value based on a receive data rate parameter, a buffer size parameter and a communications resume latency parameter.

11. The method of claim 8, comprising disabling the buffer to prevent the buffer from storing the packets of information when the communications idle duration parameter is lower than a communications idle duration threshold value.

12. The method of claim 8, comprising transferring the stored packets of information from the buffer to the computing sub-system when a buffer unload timeout value expires before a number of packets stored by the buffer exceeds the variable receive threshold value.

13. The method of claim 8, comprising transferring the stored packets of information from the buffer to the computing sub-system when a buffer unload event signal is received before a number of packets stored by the buffer exceeds the variable threshold value.

14. An article of manufacture comprising a computer-readable storage medium containing instructions that when executed enable a system to:
modify a power state for a communications sub-system and a computing sub-system from a higher power state to a lower power state;
store packets of information in a buffer for the communications sub-system during a communications idle duration period to create a computing idle duration period;
generate a variable receive threshold value for the buffer;
transfer the stored packets of information from the buffer to the computing sub-system based on a variable receive threshold value;
receive a power management message with an energy measurement parameter; and
send a request to adjust a communications rate based on the energy measurement parameter.

* * * * *